United States Patent
Larochelle et al.

(10) Patent No.: US 10,480,047 B1
(45) Date of Patent: Nov. 19, 2019

(54) PROCESS FOR RECOVERING TITANIUM DIOXIDE FROM TITANIUM CONTAINING MATERIALS

(71) Applicant: ARGEX TITANIUM INC., Laval (CA)

(72) Inventors: Eric Larochelle, West Jordan, UT (US); Carroll Moore, Indio, CA (US); Tommee Larochelle, Sandy, UT (US); Richard A. Sixberry, Boulder City, NV (US); Oumar Bashir, Saint Hubert (CA); Steeve Lafontaine, Trois-Rivières (CA)

(73) Assignee: ARGEX TITANIUM INC., Laval (CA)

(*) Notice: Subject to any disclaimer, the term of this patent is extended or adjusted under 35 U.S.C. 154(b) by 0 days.

(21) Appl. No.: 16/022,603

(22) Filed: Jun. 28, 2018

(51) Int. Cl.
*C22B 34/12* (2006.01)
(52) U.S. Cl.
CPC .............. *C22B 34/1245* (2013.01)
(58) Field of Classification Search
CPC .. C22B 34/1245; C22B 34/12; C22B 34/1236
See application file for complete search history.

(56) References Cited

U.S. PATENT DOCUMENTS

| | | |
|---|---|---|
| 3,795,727 A | 3/1974 | Yamamura et al. |
| 3,942,976 A | 3/1976 | Cornell |
| 6,440,383 B1 | 8/2002 | Duyvesteyn et al. |
| 6,548,039 B1 | 4/2003 | Duyvesteyn et al. |
| 2006/0171877 A1* | 8/2006 | Dadachov ............ B01J 20/0211 423/610 |

FOREIGN PATENT DOCUMENTS

| | | | | |
|---|---|---|---|---|
| WO | WO-0100531 A1 * | 1/2001 | ............. | B82Y 30/00 |
| WO | WO 2014/085903 | 6/2014 | | |

OTHER PUBLICATIONS

Charbonneau, et al., Nucleation and Growth of Self-Assembled Nanofibre-Structured Rutile (TiO2) Particles via Controlled Forced Hydrolysis of Titanium Tetrachloride Solution, Journal of Crystal Growth, 312 (2009) 86-94 (9 pages).

\* cited by examiner

*Primary Examiner* — Melissa S Swain
(74) *Attorney, Agent, or Firm* — McCracken & Gillen LLC (57) ABSTRACT

A process operating at super-atmospheric pressure for leaching a titanium containing ore with an HCl and producing titanium dioxide with integrated steps of solvent extraction for removing iron from the leached ore and solvent extraction of a resulting titanium enriched raffinate to produce particles suitable for finishing into pigment grade $TiO_2$. The process can integrate the recovery of HCl from both solvent recovery steps and the recovery of solvent. The process also produces commercial grade ferric chloride.

19 Claims, 7 Drawing Sheets

PROCESS FOR RECOVERING TITANIUM DIOXIDE FROM TITANIUM CONTAINING MATERIALS

FIELD OF THE INVENTION

This invention generally relates to the processing of titanium containing ores and the production of titanium-based products, such as pigment grade titanium dioxide.

BACKGROUND OF THE INVENTION

There are known methods for converting titanium containing ores into titanium dioxide, titanium metal, and related pigment grade products for use in coatings applications. Such known methods have focused on manufacturing using sulfuric acid, chlorine, or aqueous hydrochloric acid as lixiviants to extract titanium from a variety of ores. Various known methods relate to conditions, compositions, processing steps, and mechanisms for ore processing, but have a number of drawbacks including commercial feasibility, efficiency, and environmental issues. Typical conventional methods use batch rather than continuous processes and fail to effectively convert ore components into useful and/or environmentally friendly materials. Limitations in conventional methods often limit process conditions and the ores suitable for processing.

Iron recovery processes can also produce other useful product. Such products include ferric chloride for use as a coagulant in water treatment processes. Presently waste from iron pickling such as cold roll milling provides a common source for such coagulants. However, such sources leave significant cation content and can have residual acidity (excess HCl will degrade water pH) both of which detract from the use of such sources as water treatment coagulant.

Thus, there is a need for new and distinct technologies for advantageously processing titanium containing ores and producing titanium dioxide as well as other products.

SUMMARY OF THE INVENTION

This invention overcomes or ameliorates the above described problems of the prior art with a process that efficiently recovers metal values and other products from titanium containing ore in a unique arrangement of specialized steps. Implementations of processes and systems described herein can facilitate the processing of titanium ore in a commercially viable manner materials to produce titanium dioxide products that are pigment grade. The process can also provide a superior ferric chloride solution for coagulant use in water treatment.

Some embodiments of this invention use continuous processes in specific flow and unit arrangements to increase economic viability and reduce environmental impacts relative to those of existing commercial processes. The unique ore conversion approach employed in the processes and systems of this invention can eliminate or ameliorate the various prior restrictions on processing conditions and ore usage while still efficiently and economically producing commercially acceptable pigment grade products. Thus, the overall technology and various technological aspects described herein are distinct and advantageous with respect to conventional and known technologies.

Implementations of processes and systems described herein facilitate the processing of titanium ore or materials more efficiently to produce pigment grade titanium dioxide products, as well as obtaining other by-products, in a commercially viable manner. Preferred implementations use a continuous process and various features described herein to increase economic viability and reduce environmental impacts common to existing commercial processes. Any one of the process steps described herein can use the vessel configuration as described or another suitable pressure vessel type and internals. This invention also provides most benefit by comprising using pressurized vessels and these can employ inert gases such as $N_2$ or $CO_2$ for diluent and pressure medium purposes where appropriate.

This invention improves upon conventional methods that use batch rather than continuous processes and fail to address the past problems of converting ore components into useful and/or environmentally friendly materials. Conventional methods also suffer from limitations on process conditions and limitations on ores in known processing methods. Implementations of processes and systems described herein facilitate the elimination of various restrictions on processing conditions and provide a unique approach to the conversion of ores into commercially acceptable pigment grade products with attendant economic benefit.

In a broad comprehensive process embodiment, this invention is a process for producing a pigment grade titanium oxide product. The process leaches a feed material comprising titanium containing ore at high intensity with an acidic leaching solution comprising water and HCl to form a leaching slurry optionally having a solids content of at least 20 wt % on a total slurry basis and separates the leaching slurry into a solid residue stream and a pregnant liquor comprising titanium and iron compounds. Solvent extraction then removes iron compounds from the pregnant liquor and provides an iron enriched stream and an iron depleted stream. Solvent extraction then extracts titanium compounds from the iron depleted stream and produces a titanium enriched stream and a titanium depleted raffinate stream and recovers HCl from the iron enriched stream and the titanium depleted raffinate stream for reuse in the leaching step. Hydrolysis of the titanium enriched stream under plug flow conditions produces a hydrolysate stream comprising $TiO_2.H_2O$ particles All of the preceding steps of the process operate at super-atmospheric conditions. Drying the hydrolysate stream at mild conditions removes interstitial water while inhibiting rupture of the $TiO_2.H_2O$ particles to produce a dried hydrolysate stream that undergoes calcination of the $TiO_2.H_2O$ to produce a calcined $TiO_2$ material suitable for conversion into a pigment grade titanium oxide product.

This embodiment can incorporate a wide range of variations. In a simple variation the leaching slurry optionally has a solids content of 20 wt % to 35 wt %. In another variation HCl mixed with the water has an HCl concentration above 11N. In another variation the water and HCl in the acidic HCl solution has an HCl concentration above the HCl azeotrope concentration. In yet another variation of the above embodiments the plug flow conditions are provided by a reactor arrangement. Other embodiments of this invention can vary the steps and arrangement as taught herein.

A more limited process embodiment this invention leaches a feed material comprising titanium containing ore having a mean particle size below 100 microns at high intensity by contacting the feed material with an acidic leaching solution comprising water and HCl at an HCl concentration above 11N to form a leaching slurry having a solids content of 20 to 35 wt % on a total slurry basis. This arrangement leaches the slurry into a solid residue stream and a pregnant liquor comprising titanium and iron compounds and then adds chlorine to the pregnant liquor to promote conversion of $FeCl_2$ (ferrous chloride) into $FeCl_3$ (ferric chloride.) This forms a treated pregnant liquor from which solvent extraction removes $FeCl_3$ and to produce an $FeCl_3$ enriched stream and an $FeCl_3$ depleted stream. Additional solvent extraction removes titanium compounds from the $FeCl_3$ depleted stream to produce a titanium enriched stream and a titanium depleted raffinate stream that returns to the high intensity leaching as recycle. Plug flow hydrolysis of the titanium enriched stream at a temperature of 110 to 125° C. produces a hydrolysate stream comprising $TiO_2.H_2O$ particles. All of the preceding steps and operations take place at super-atmospheric pressure. $TiO_2.H_2O$ particles undergo drying at mild conditions from 100 to 250° C. for 2-4 hours to remove interstitial water while inhibiting rupture of the $TiO_2.H_2O$ particles to produce a dried hydrolysate stream. Calcination converts the dried $TiO_2.H_2O$ in the hydrolysate stream to $TiO_2$ and produces a calcined $TiO_2$ material that further finishing can convert into a pigment grade titanium oxide product.

A simplified independent aspect of this invention is a high intensity leaching method for leaching titanium from a titanium containing ore. The method contacts a feed material comprising a titanium containing ore with an acidic leaching solution at super-atmospheric pressure to form a leaching slurry having a solids content above 20 wt % on a total slurry basis. The acidic leaching solution comprises water and HCl at an HCl concentration at least 5 wt % above the water-HCl azeotrope concentration.

Another independent aspect of this invention is a hydrolysis method for hydrolyzing a titanium rich stream to produce a hydrolysate stream comprising $TiO_2.H_2O$ particles. The method includes feeding the titanium rich stream into a plug flow reactor at super atmospheric pressure and a temperature of 110 to 125° C.

The invention also provides a method for drying a hydrolysate stream comprising $TiO_2.H_2O$ particles at mild drying conditions maintained in a range of 100 to 250° C. for 2-4 hours. These mild conditions remove interstitial water from the hydrolysate stream while inhibiting rupture of the $TiO_2.H_2O$ particles, to produce a dried hydrolysate stream with intact $TiO_2.H_2O$ particles and a moisture content below 5 wt %.

A system form of this invention produces a pigment grade titanium oxide product. The system delivers a feed containing titanium ore to a leaching unit configured for high intensity leaching by contact with an acidic leaching solution comprising water and HCl at an HCl concentration above 11N to form a leaching slurry having a solids content between 20-35 wt % on a total slurry basis. A separator in the system separates the leaching slurry into a solid residue stream and a pregnant liquor comprising titanium and iron compounds to which a chlorine addition unit supplies chlorine that contact the pregnant liquor with chlorine to promote conversation of $FeCl_2$ into $FeCl_3$ to form a treated pregnant liquor. The system contacts the treated pregnant liquor with an organic solvent in a first solvent extraction unit configured in a manner to remove $FeCl_3$ and provide a $FeCl_3$ enriched stream and $FeCl_3$ depleted stream. A second solvent extraction unit with a system configuration to receive the $FeCl_3$ depleted stream and an organic solvent composition extracts titanium containing compounds from the $FeCl_3$ depleted stream to produce a titanium enriched stream and a titanium depleted raffinate stream. An HCl recovery unit of the system receives the $FeCl_3$ enriched stream and the titanium depleted raffinate stream is configured for recover a high concentration HCl stream for reuse in the high intensity leaching unit. A hydrolysis unit configured to receive the titanium enriched stream converts it to a hydrolysate stream to produce a hydrolysate stream comprising $TiO_2.H_2O$ particles under plug flow conditions at a temperature of 110-125° C. The configuration of the system operates all of the preceding steps at super atmospheric pressure. The system incorporates a drying unit for drying the hydrolysate stream at mild conditions to remove interstitial water while inhibiting rupture of the $TiO_2.H_2O$ particles, to produce a dried hydrolysate stream. A calcination unit calcination unit of the configuration dries the hydrolysate stream and converts $TiO_2.H_2O$ to $TiO_2$ thereby producing a calcined $TiO_2$ material that a final conversion unit of the system can convert into a pigment grade titanium oxide product.

Further independent aspects of this invention include reactors for usage therein. In one such aspect a hydrolysis reactor comprising a boustrophedonic reaction conduit having an inlet that receives the titanium rich stream and an outlet that releases the hydrolysate stream for further processing. The reactor arrangement may include temperature and pressure controls for operating at a temperature of 110 to 125° C. and super atmospheric conditions. In another reactor aspect of this invention uses a hydrolysis reactor to hydrolyze a titanium rich stream and produce a hydrolysate stream comprising $TiO_2.H_2O$ particles by passage through a plug flow reaction conduit having an inlet that receives the titanium rich stream and an outlet that releases the hydrolysate stream. Reactor operation includes temperature and pressure control systems to maintain a temperature of 110 to 125° C. and super-atmospheric pressure.

Other technology aspects of the invention apply to processing titanium containing streams. For instance, an advantageous reactor design hydrolyzes a titanium rich stream to produce the hydrolysate stream comprising $TiO_2.H_2O$ particles that includes feeding the titanium rich stream into a plug flow reactor and/or a boustrophedonic reaction conduit operated above atmospheric and at a temperature of 110 to 125° C. The drying method also provides benefits to the processing of the ore by drying the hydrolysate stream of $TiO_2.H_2O$ particles, at mild drying conditions of 100 to 250° C. for 2 to 4 hours. The mild drying removes interstitial water from the hydrolysate stream while inhibiting rupture of the $TiO_2.H_2O$ particles thereby keeping the dried particles in the hydrolysate stream intact while reducing the moisture content, optionally to below 5 wt %. Specific features utilized in the practice of the invention either alone or combination include selectively operating certain process steps above atmospheric pressure, providing a high intensity leaching stage for leaching titanium from the feed material, and operating an HCl recovery system that breaks the HCl-water azeotrope to regenerate a high concentration HCl material (i.e., above the azeotrope concentration) for reuse in the leaching stage.

BRIEF DESCRIPTION OF DRAWINGS

The further description of the invention along with the drawings provides additional unique technological features for incorporation into the practice of the invention.

DETAILED DESCRIPTION OF THE INVENTION

Techniques described herein relate to enhanced processes and systems for processing titanium containing ore and producing titanium dioxide, particularly of pigment grade. The processes and systems described herein include various innovative features that facilitate enhanced efficiency and/or product quality, as will be described in further detail below.

Definitions

The term about means a variation of plus or minus 5% from any stated value.

The notation "bar-g" means gauge pressure.

The term super-atmospheric pressure means pressure above atmospheric pressure.

Titanium Containing Ores and Preparation

In some implementations, the process can be used for processing one or more types of titanium containing ore, such as rutile which has a high Ti content and/or ilmenite which has a notably lower Ti content. Other titanium sources can also be used as feedstock for the process. For example, the titanium sources can include upgraded slag, mine tailings, and the like. In some implementations, the process includes the preparation of a titanium containing feedstock from one or more sources and includes, e.g., at least any amount from 20 wt % to 50 wt % of Ti upon feeding into the process.

The process can accept mined ores of various compositions having a suitable particle size and for most applications will have a mean diameter less than 100 microns, preferably less than 75 microns, and typically between 50-100 microns, 60-90 microns, or 70-80 microns. Commercially available ores typically do not meet this specification and will undergo grinding in an initial pre-treatment step of the process. Preferably, the ore feed comprises ilmenite with a relatively low titanium oxide content of 35-55 wt %, 40-50 wt %, or 45 wt %, for example.

Multiple different titanium sources can be blended upstream such that the ground material fed into the process has certain predetermined or desired properties, e.g., Ti content, granulometry, and/or other compositional properties.

Detailed Description of the Drawings

Figure 1A:
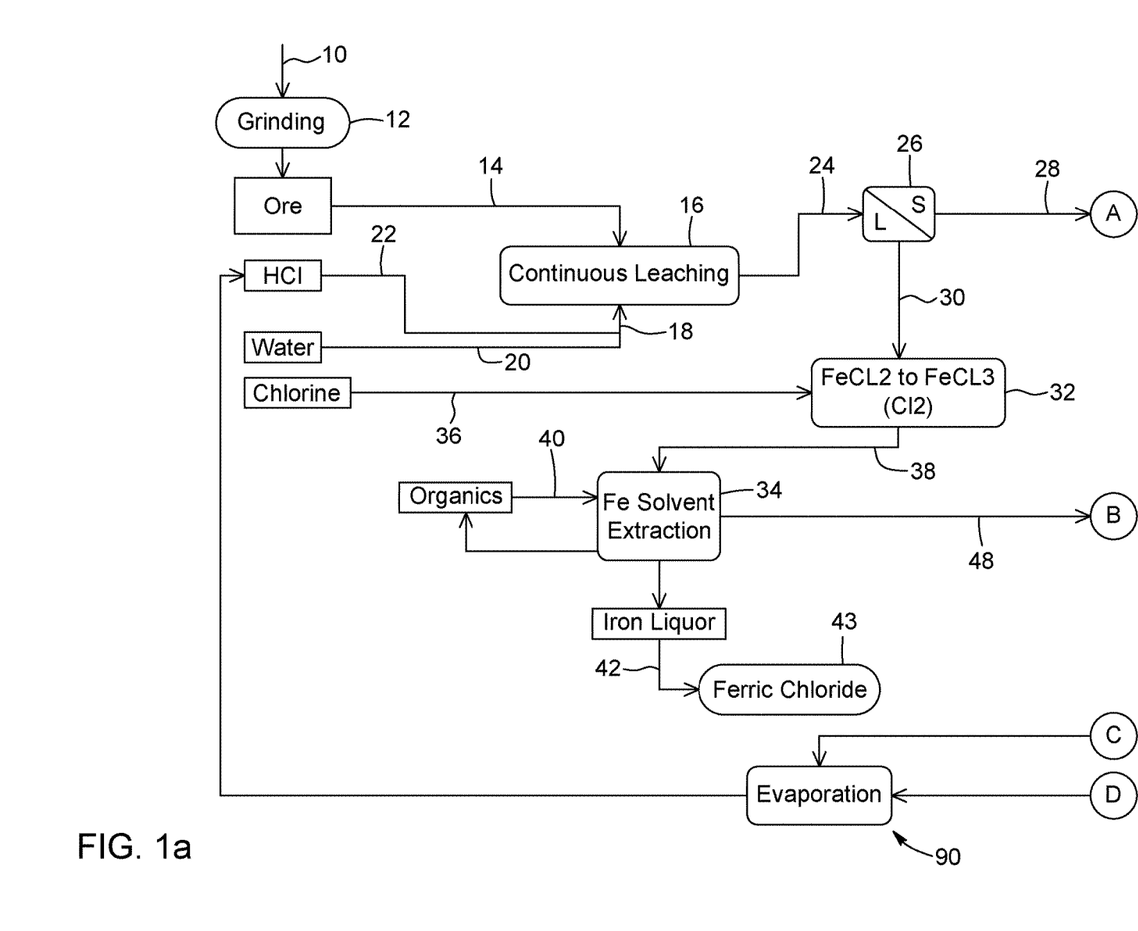
FIGS. 1a and 1b show a flow diagram for processing a titanium containing ore.

FIGS. 1a,b and 2a,b show two versions of the many different flow arrangements for practicing the process of this invention. These figures are schematic and do not show all of the related equipment and controls that are well known and commonly used to practice such flow arrangements. Reference numbers will refer to the contents of the conduits that their lead lines touch.

Figure 2A:
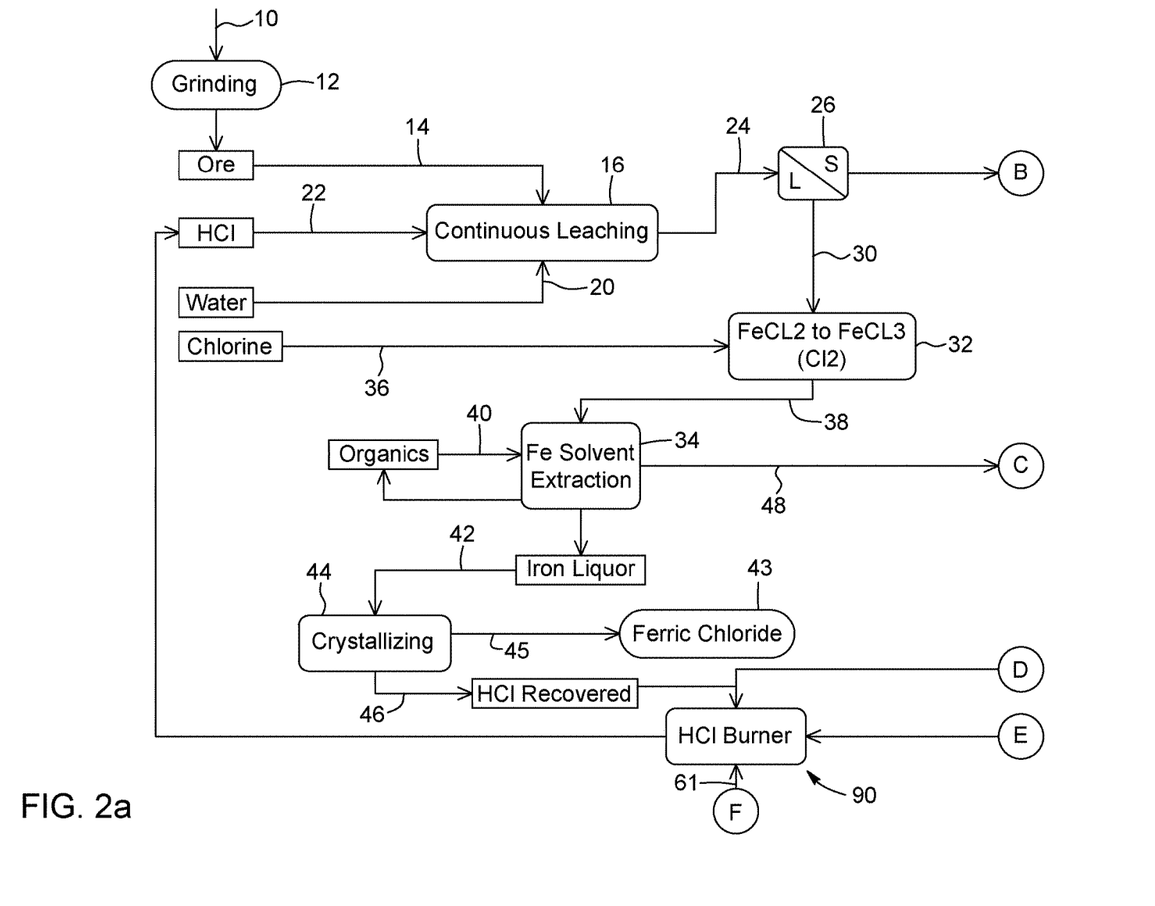
FIGS. 2a and 2b show alternate flow diagrams from that shown in FIGS. 1a and 1b for processing a titanium containing ore.

In the flow arrangements of FIGS. 1a and 2a titanium containing material 10 passes to a pre-treatment for size reduction performed by grinding step 12, which may include screening to produce ground material 14. Preferred ground material has a relatively consistent granulometry.

Acid Leaching

Ground material 14 passes to one or more leaching steps performed in respective leaching units. Preferably the leaching takes place continuously as shown by a continuous leaching step 16 in which the ground material is contacted with an acidic leaching solution 18 (also referred to as the lixiviant.) A leaching solution 22 preferably comprising a high concentration of HCl passes to continuous leaching step 16.

Preferably, leaching 16 is performed at relatively high solids content and high acidic concentrations. For example, the leaching normally takes place with a solids content at least greater than above 10 wt %, more typically at least greater than 15 wt % and in many cases above 20 wt %. Common ranges of solid content in the leaching ranges of 20 to 35 wt %, preferably 25 to 35 wt %, and often in a narrow range of 27 to 33 wt %. The acidic conditions can be provided by using a normal leaching solution having a HCl concentration of about 11 to 13N, 11.5 to 12.5N, or about 12N. The HCl solution can be provided with an HCl content of at least 30 wt %, or between 30 to 37 wt %, or 35 to 37 wt %, for example. The acidic solution can also be augmented with anhydrous HCl. Conventional technologies for leaching operations tend to use low solids contents (e.g., below 10 wt %) and low acidity levels (e.g., below 10N). This invention uses a considerably higher than conventional ore solids content in the leach is notably higher than conventional levels, as dilution is often the basis for conducting this conversion.

FIG. 1a shows the acidic leaching solution 18 prepared by combining leach water 20 and an HCl source 22 prior to supplying the acidic leaching solution 18 into the leaching unit. In this scenario, the water and HCl can be mixed in a mixing unit and then the acidic leaching solution 18 can be fed into the leaching unit via a single inlet.

Alternatively, FIG. 2a, shows the water 20 and HCl source 22 supplied via separate inlets into leaching step 16 to form the acidic leaching solution in situ within one or more vessels. Introduction via multiple individual streams can enhance control reaction parameters.

Leaching step 16 can use a combination of feeding a mixture of HCl and water as per FIG. 1a and also as a separate stream as per FIG. 2a. Thus, leaching unit 16 can accommodate the various forms of leach solution feeds with corresponding inlets and flow controls. The HCl source can include HCl recovered from a recycle system as described in detail below Anhydrous HCl can be added to leaching step 16 at one or more points in the digestion train and can stabilize the proton content of the solution as chloride is taken up by the reaction to render the ore components soluble as chloride and/or hydroxy chloride salts. Continuous leaching step 16 can thus be equipped with appropriate inlets for adding different streams compounds and additives at different locations. Leaching step 16 can inject HCl gas into a leaching vessel via distributors located therein.

The high intensity leaching can provide operational advantages and benefits in the titanium extraction process of this invention. Some benefits include reduced equipment sizes, reduced reaction time (e.g., by 50%), and a titanium extraction above 90 wt % of the ore feed. Energy consumption is also reduced as the reaction exotherms generate a significant level of heat energy in the leach reaction system.

Preferably, HCl comprises the substantial acidifying component of the acidic solution used in leaching step 16. However, some alternative implementations can employ any necessary process modification to use HCl in combination with other compounds and/or other acids. The process can use overpressure to contain volatile components such as HCl vapors.

Figure 1B:
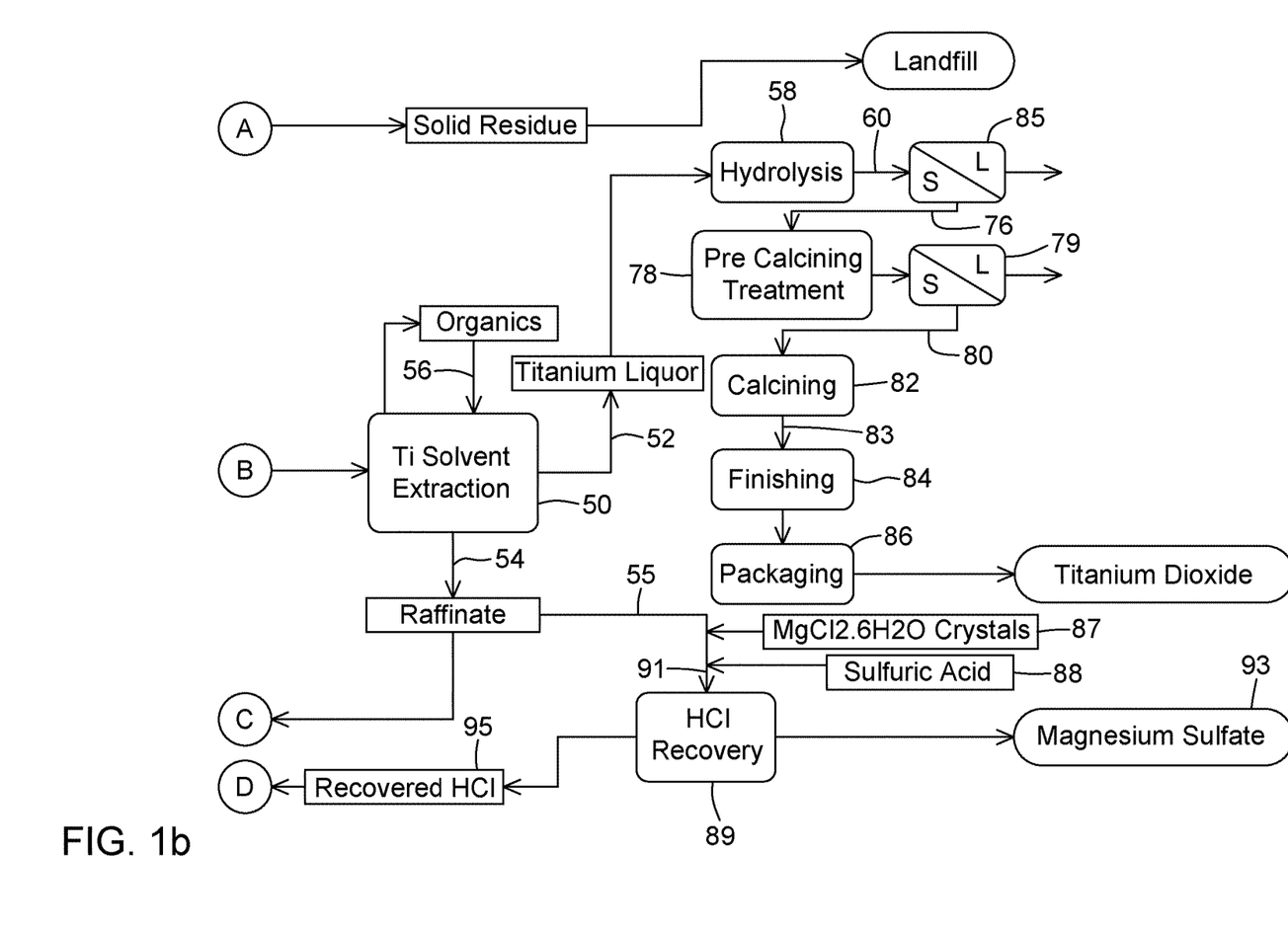
Figure 2B:
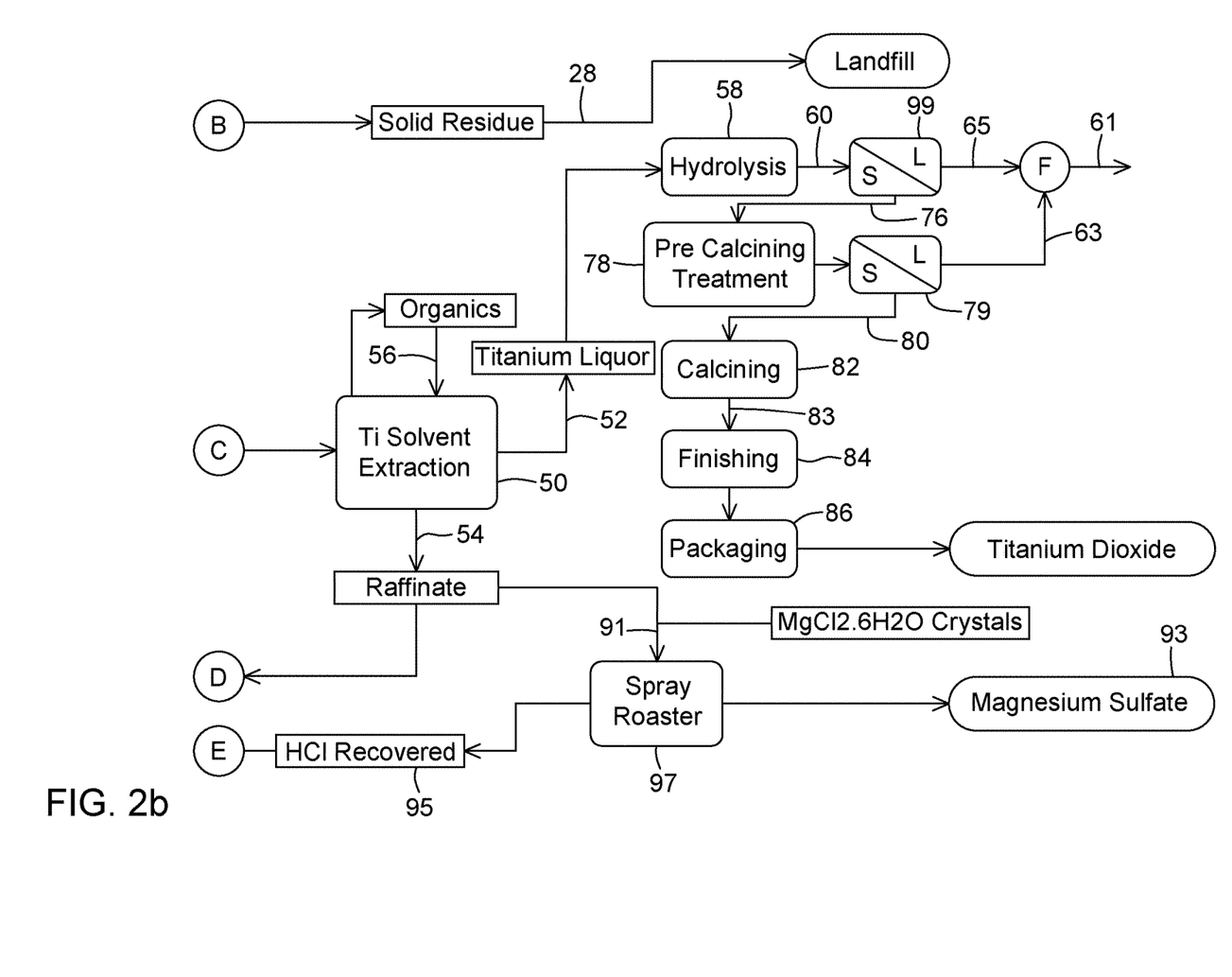

The continuous leaching step 16 produces a leaching slurry 24 that passes to a solid-liquid separation step 26 that produces a solid residue 28 along with a pregnant liquor 30 depleted in solid material. A separation step 26 can use any type of solid-liquid separator including those using one or more stages of separation. Possible methods for separation include centrifugation to remove suspended solids. In addition, the solid residue can undergo additional downstream treatments to remove residual liquid or otherwise prepare the solid residue for disposal (e.g., via landfill as shown in FIGS. 1b and 2b.) For example, a washing step (e.g., acid wash) can recover compounds such as Ti from the solid residue with the resulting wash liquid recycled back into the leaching unit.

Removal of Iron

Iron is then removed from pregnant liquor 30. Methods to remove iron include a ferrous chloride conversion step 32. Recovery of iron continues with a solvent extraction (SX) step 34. (Also known as a solvent exchange process.) Conversion step 32 adds chlorine 36 to pregnant liquor 30 to promote conversion of $FeCl_2$ to $FeCl_3$ and produce a ferric chloride enriched solution 38 (pregnant leach solution—PLS) for the extraction of iron therefrom in iron solvent extraction step 34.

Various organic solvents 40 can be used for the iron solvent extraction step and their selectivity for metal in the pregnant liquor will vary. Typical solvents are ketonic hydrocarbons and preferably branched chain ketonic hydrocarbons. Suitable extractive solvents include ketones of the general structure iso-$C_x$ ketone, with a particular preference for ketones with tertiary carbon atoms. The choice of extractive solvents usually depends on the desired solvent selectivity at the desired operating conditions. Specific ketones suitable for the SX step of the process include methyl isobutyl ketone (MIBK), diisobutyl ketone (DIBK), hexyl ketones alone or in combination and with other such solvents.

The most useful temperature conditions in the SX step usually varies with the selected solvent composition as well as the composition of the pregnant liquor. Most suitable solvent compounds have relatively low flash points and are quite volatile at the typical operating temperature conditions in the SX. Temperatures of the SX step usually range of from 35 to 65° C. Accordingly the SX system will normally operate under positive pressure to prevent release of volatile solvent compounds. A vent (not shown) is also provided to remove organics prior to release of the inert gas (e.g., nitrogen, $CO_2$ are potential options for inert gas) to the atmosphere after scrubbing.

The arrangement of the Fe solvent extraction step (which can also be referred to as the solvent exchange process) recovers high concentrations of solid metals from the PLS. The invention uses a typical SX organic circuit to clean-up the solvent by extracting cells, scrubbing cells and stripping cells which extract, purify and strip metals from a given solvent to provide purified Fe and Ti metals. The method of this invention contrasts with other methods that rely on higher dilution to increase solvent effectiveness.

The solvent composition can include a modifier, a viscosity reducer, and an extractive solvent. Suitable modifiers include Exxal 13™ manufactured by Exxon comprising a distillation cut from a propylene oxide production having a branch chain oxy hydrocarbon and a specific steric composition which contains polymerized units of propylene and oxygen. Suitable viscosity reducers include kerosene having a with boiling range different from that of conventional jet fuel. The viscosity reducer reduces the viscosity of the solvent composition to permit better interaction in the mixing systems of the SX unit(s).

Some arrangements of this invention use a unique recirculation approach for purification of the metal extractants in both Fe (and Ti circuit as later described.) This approach purifies the Fe extractant in the Fe circuit (also applicable to Ti extraction as described later) with an essentially complete stripping of the solvent for Fe recovery. The essentially complete stripping typically carries over some undesirable cations. The recycle system design retains some Fe in the solvent such that the solvent conditioning step can eliminate at least some of the undesirable cations. For example, the invention can facilitate Fe recovery with an SX whereby Fe "crowds out" Ti in the iron solvent extraction stage, such that Ti remains in the Fe raffinate rather than being extracted with the $FeCl_3$.

Solvent extraction step 34 feeds the ferric chloride enriched solution 38 into at least one vessel along with an organic Fe extraction solvent 40 for producing an iron enriched liquor 42 and an iron depleted, pregnant liquor 48. Treatment of the iron enriched liquor 42 can produce one or more end products FIG. 1a shows recovery of iron enriched liquor 42, often following an evaporation step (not shown) that forms an aqueous concentrate in a manner hereinafter described in more detail. Typically, this concentrate has a composition suitable for coagulant use in water treatment and purification. The typically very high purity of $FeCl_3$ in iron enriched liquor 42 facilitates evaporation and formation of a ferric chloride 43 product.

FIG. 2a shows an implementation where an iron enriched liquor 42 undergoes further treatments to recover HCl from the liquor. This configuration uses crystallization as hereinafter described in more detail.

A second stage of leaching (not shown) digests Fe prior to the crystallization stage. Crystallization of the digested Fe to form $FeCl_2$ crystalline material can remove significant quantities of Fe from the liquor 42. Some implementations of this invention can recover up to 25 wt % of crystalline $FeCl_2$ (e.g., potential yield of $Fe_2$ crystallites from this second stage of leaching.) Proper control of the acid concentration, the temperature conditions and the solubility of the acid salts to in second leaching will promote crystallization of the $FeCl_2$. In contrast these parameters will vary significantly when seeking to avoid crystallization of the digested Fe. Removal of iron can provide a yellow pigment precursor. Ferric chloride 43 finds multiple product uses.

The iron extraction operation can also or alternatively convert iron enriched liquor 42 into FeOOH through a secondary process (not shown.) Conversion to FeOOH can involve a neutralization (e.g., with caustic) to precipitate FeOOH from the pregnant leach solution which is partially crystallized as FeO in the process. This alternate step neutralizes the $FeCL_2$ with NaOH under controlled temperature to precipitate the hydroxide in crystalline configurations with suitable for quality for pigment grade usage. Specifically FeOOH is commercially useful as a yellow pigmentation additive.

Solvent Extraction (SX) of Ti

Referring to FIGS. 1b and 2b, an iron depleted pregnant liquor 48 produced by the iron solvent extraction 34 passes to a Ti solvent extraction 50 to extract Ti and produces a Ti enriched liquor 52 and a raffinate 54. Extraction step 50 uses an organic solvent 56. In a broad sense two solvent extraction steps 34 and 50 operate as an overall titanium purification system to separate titanium from other components of the pregnant liquor 30.

A variety of solvents will work in the Ti SX. Preferred solvents are those previously described for use the Fe SX.

More preferably the Ti SX and the Fe SX will use the same solvent. The solvent composition can also include a modifier (of the type previously described,) a viscosity reducer (of the type previously described,) along with the extractive solvent.

The arrangement of the Ti SX step recovers high concentrations of solid metals. As in the case of iron recovery, SX step 50 also contrasts with other methods that rely on higher dilution to increase solvent effectiveness and can again employ the unique the recirculation approach as previously described for iron solvent extraction 34. Complete stripping of the solvent for Ti recovery, may carryover undesirable cations as described for Fe solvent extraction (as may happen with Fe solvent recovery) and the recycle system and solvent conditioning step retains some Ti in the solvent to eliminate at least a portion of these cations. Ti solvent clean-up will preferably use an organic circuit as previously described. In the case of Ti, the organic circuit processes a feed of primarily Ti.

The present process produces high concentrations of Fe and Ti in the feed to the solvent extraction units. The process can produce concentrations typically 2-3 times higher than conventional processes and in the range of 60,000 to 70,000 g/l. This distinct feature can facilitate smaller equipment, faster settling times in the SX and easier stripping and scrubbing of the solvent to recover the metal(s) of interest. While the SX hardware (e.g., equipment such as piping and vessels) can be conventional, the operating conditions of mixing and settling are much more efficient with respect to solvent consumption and residence time in the cells of the SX unit.

In many cases the Ti enriched liquor 52 passes as a feed to hydrolysis. Control of liquor 52 can adjust its composition to meet specific standards (e.g., concentration of $TiOCl_2$ and chloride) that facilitate hydrolysis to exacting standards of size and morphology.

Hydrolysis

FIGS. 1b and 2b show Ti enriched liquor 52 passing to hydrolysis step 58 to produce hydrolysate 60. The hydrolysis step 58 can use different process control parameters and any suitable design of hydrolysis reactor such as the hydrolysis reactors 62 shown in FIGS. 3 and 4 and hereinafter described.

Hydrolysis reactors such as hydrolysis reactors 62 operate at conditions that form particles of $TiO_2.H_2O$. Highly suitable hydrolysis reactors are those having a plug flow design. A plug flow design means substantially laminar flow without appreciable back-mixing. Preferred plug flow design reactors will have a Peclet number of at least 100.

Preferably the plug reactor will comprise a series of pipes containing mixing elements such as pipes arranged in series and separated by in-line mixers. A variety of suitable in-line mixers will work, such as static mixers. Preferably the configuration of the mixers in conjunction with the operating conditions (e.g., flow rate), will provide substantially forward flow mixing with little to no back-mixing. Unacceptably high back-mixing can complicate residence time control and adversely affect particle size control.

In some implementations, the hydrolysis reactor 62 is configured as a Buss type reactor to promote intense mixing (as illustrated and offered by IPP—International Process Plants). A Buss type reactor constitutes a novel approach for producing $TiO_2$.

Residence time and temperature in the hydrolysis reactor are controlled to provide particles having proper morphology (rounded shape) and approximately the size desired for commercial pigment grade $TiO_2$. Preferably particle size ranges from 180 to 400 nm in distribution (e.g., as measured by an optical analyzer which typically generates a bell curve). The hydrolysis reactor operates at a pressure that controls the generation of HCl in the reaction and a temperature well above the azeotropic boiling point at atmospheric pressure. In most cases the hydrolysis operates at a pressure up to 5 bar-g, preferably from 0.15 to 4 bar-g, more preferably 0.15 to 2 bar-g and most preferably at 0.15 to 0.25 bar-g; and usually at a temperature up to 125° C., and preferably from 110 to 25° C., and more preferably from 115 to 120° C.

Conventional hydrolysis methods operate at atmospheric conditions that limits the temperature to about 104° C. which, in turn, slows the reaction considerably and fails to provide enhanced morphology for the hydrolysate product. Pressure control also allows controlled venting which protects the surrounding atmosphere near the reactor and permits recovery of substantially all HCl produced by the hydrolysis reaction. A preferred implementation of the hydrolysis reactor described herein operates at elevated pressure and temperature to form proper morphology and particle size of the $TiO_2$ hydrolysate.

Conventional hydrolysis processes have used batch or stirred tanks operating at the azeotrope boiling point of HCl at atmospheric conditions. FIGS. 3a-3g illustrate some of the preferred configurations for the hydrolysis step 58 and associated reaction zones in the form of a reaction conduit 66 comprising a pipe. The pipe type of reaction conduit 66 can use any configuration that preferably provides an extended length of pipe. Although FIGS. 3a-3g show a single conduit, the hydrolysis step 58 can use multiple reaction conduits operating in series and/or parallel. Configurations of hydrolysis reactor 62 also include a feed inlet 68 and a product outlet 70 at the ends of reaction conduit 66.

The reaction conduits 66 can include one or more in-line mixers 71 as depicted in FIGS. 3a-3d. Preferred configurations place in-line mixer at regular intervals and typically in the straight portions of the conduits. Thus, the invention will preferably use at least one and more preferably multiple mixers distributed along a length of the reaction conduit.

Figure 3A:
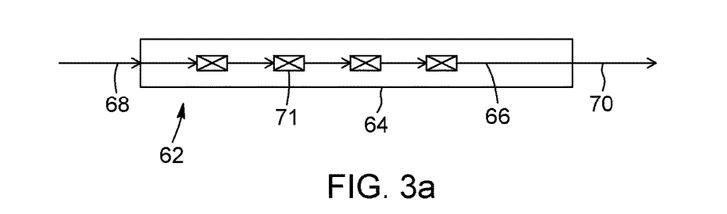
FIGS. 3a-3g are schematic diagrams of hydrolysis reactor configurations.
Figure 3B:
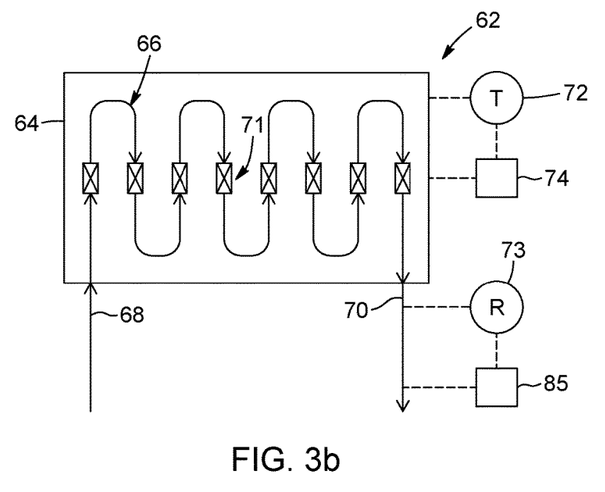
Figure 3C:
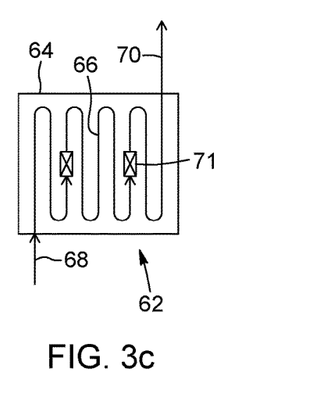
Figure 3D:
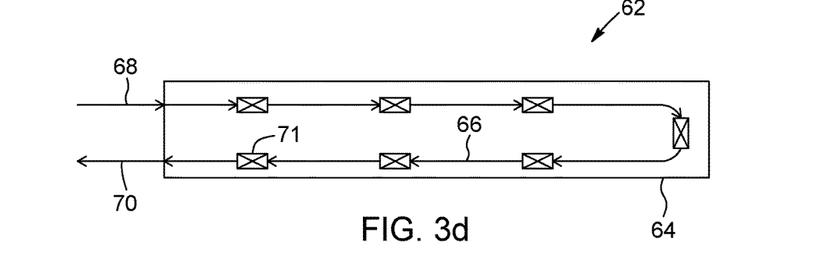
Figure 3E:
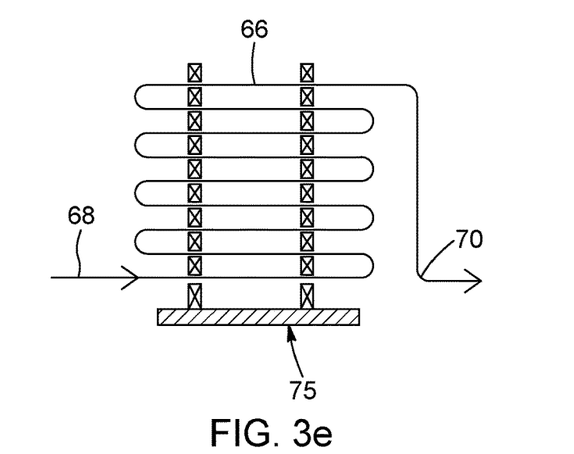
Figure 3F:
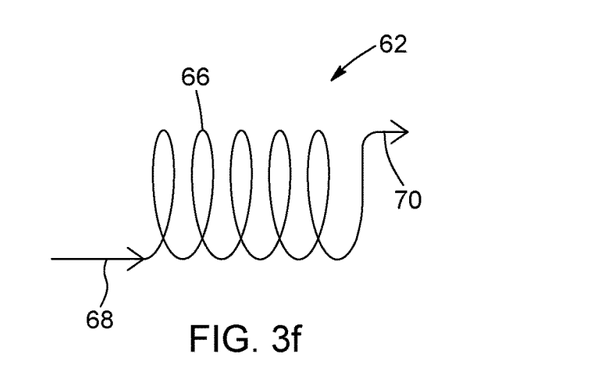
Figure 3G:
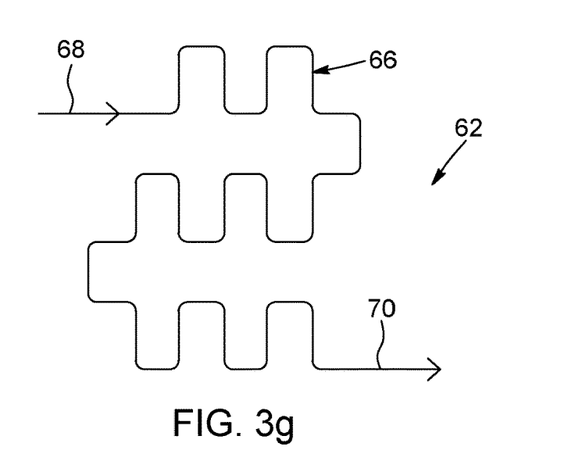

FIGS. 3a-3g show only a sampling of the wide variety of shapes for the pipe that reaction conduit 66 can take. The reaction conduit 66 can comprise one or more linear lines. FIGS. 3a and 3d show respective arrangements of a single line and two linear pipe sections connected by a curved section. FIGS. 3b, 3c and 3e show reaction conduit 66 in a boustrophedonic i.e. serpentine configuration. FIG. 3f illustrates a spiral configuration for reaction conduit 66. Further configurations for the reaction conduit include pulse waves. FIG. 3g depicts a square wave variety of pulse waves as a reaction conduit configuration 66.

As representatively shown in FIG. 3b, the hydrolysis step 62 can also include one or more temperature sensors 72 coupled to a controller 74 as well as a residence time sensor 73 and controller 85. The hydrolysis reactor can operate generally adiabatically by controlling the inlet flow of nuclei and $TiOCl_2$ such that the fluid temperature does not substantially decline from that of the inlet feed. Measurement of the effluent particle size by optical analysis prior to feeding downstream (e.g., to dryer) can provide inlet control set points.

FIGS. 3a-e show ancillary elements of hydrolysis reactor 62. FIGS. 3a-3d show each reaction conduit 66 within a housing 74. FIG. 3e shows a reaction conduit 66 in a boustrophonic arrangement without a housing and conduit retained in place by a support structure 75 having arms that extend vertically from a base.

Figure 4:
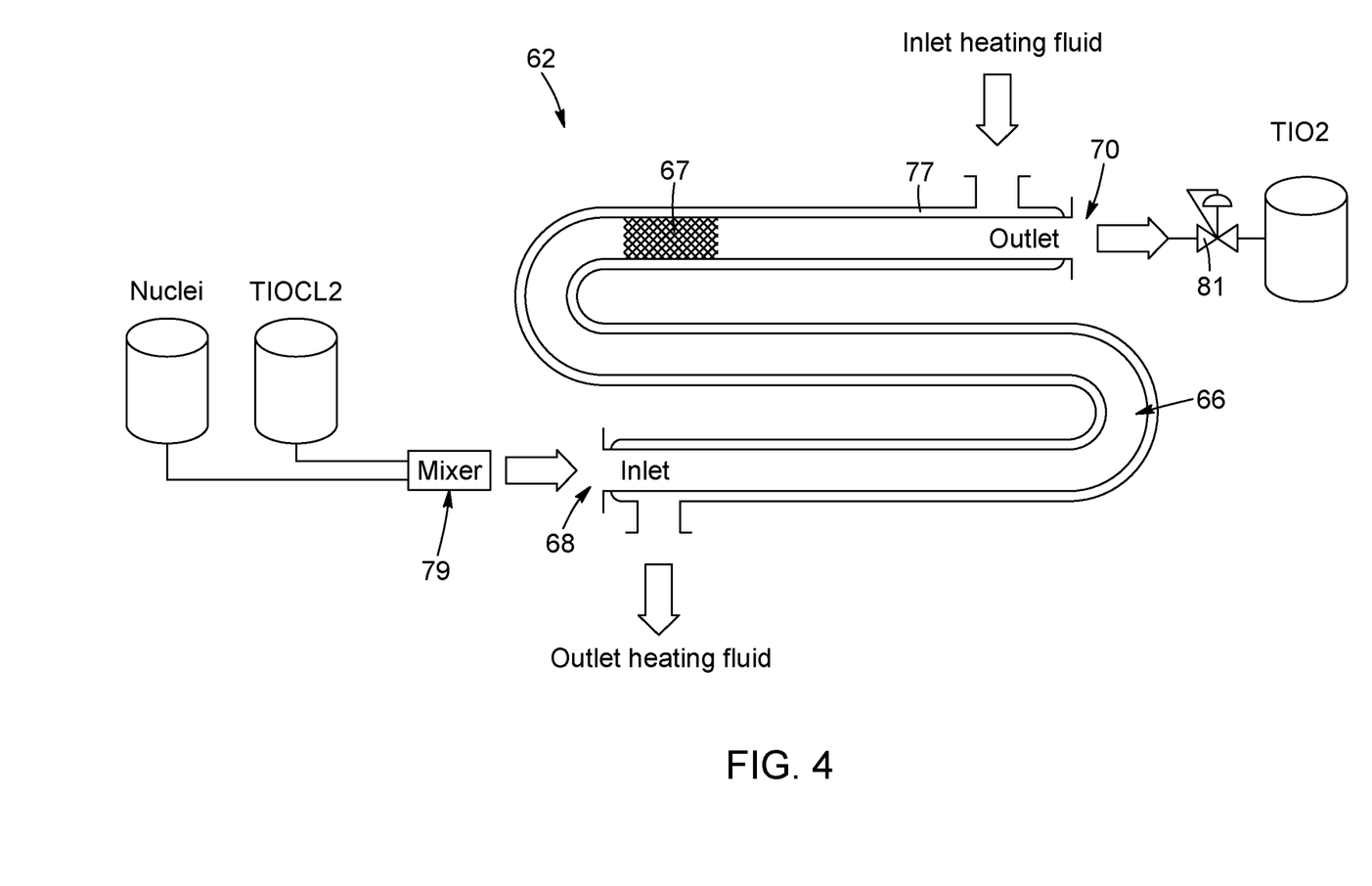
FIG. 4 is a schematic of an arrangement for a hydrolysis reactor.

FIG. 4 illustrates another example of the hydrolysis reactor 62. A heating jacket 77 surrounds reaction conduit 66 of the hydrolysis reactor 62 to receive and expel a heating fluid to conductively heat the hydrolysis fluid as it passes though conduit 66. The heating fluid typically enters heating jacket 77 at the downstream end of the reaction conduit 66 and exits from the upstream end. Although FIG. 4 shows a single flow of heating fluid through pipe 66, the heating fluid can enter and or leave reaction conduit 66 at multiple points anywhere along its length. The hydrolysis fluid may also pass through one or more plug flow elements 67 that fully or partially occlude the path through reaction conduit 66.

FIG. 4 also shows the flow path of hydrolysis fluid from feed tanks to a storage tank. Preferably separate feed tanks will provide nuclei and TiOCl2 that pass through a mixer 79 and then enters reaction conduit 66 through an inlet 68 and exits through an outlet 70. A back-pressure valve 81 controls the pressure in reaction conduit 66. FIG. 4 shows a typical storage tank that communicates with outlet 70 to receives the hydrolysis effluent.

The nuclei can be added based on various parameters and methods; produced by various methods; and added to reaction conduit 66 in a variety of ways other than that depicted by FIG. 4. Addition of nuclei often ranges from 0.1 wt % to 2.5 wt % and sometimes at a concentration of less than 1.0 wt %. Nuclei can be produced using a neutralization step to precipitate $TiOCl_2$ in the hydrolysis feed. Nuclei size typically falls below 35 nm in size and preferably below 25 nm in size. The above description is not a limitation on the nuclei properties, methods of production, and methods of addition.

Pre-Calcination/Drying

FIGS. 1b and 2b show hydrolysate stream 60 passing from hydrolysis reactor 58 to a solid-liquid separation section 99. Separation section 99 can use any type of separation and often employs a centrifuge or filter, typically in plate form, to remove concentrated acid and wash water from the hydrolysate contained in acid medium of the hydrolysis reactor. A solids-containing fraction 76 including $TiO_2.H_2O$ particles passes to a pre-calcination stage 78 to remove moisture prior to pre-calcination or calcination.

Pre-calcination stage 78 or stage removes or reduces moisture in the solid fraction before it undergoes elevated temperature calcination. Preferably, pre-calcination stage 78 operates under low intensity conditions in which control of time and temperature during drying avoids boiling of the interstitial moisture in the solid fraction. Avoiding rapid boiling prevents or inhibits pressure from creating internal particle pressure in the particle and resulting in rupture or explosion of particles, much like popcorn popping. Conducting the pre-calcination drying step in a manner that slowly removes any moisture, including surface, unbound, and bound water contained in the particles will avoiding pressure build-up and prevent or mitigate damage to particles. Thus, pre-calcination stage 78 gently dries solid fraction 76 to produce a dried solid fraction 80 containing $TiO_2.H_2O$. The dried stream from the pre-calcination stage 78 may pass through a solid-liquid separation section 79 that supplies dried solid fraction 80.

The drying unit typically operates at temperatures of 100 to 250° C. with a preferred range of 120–230° C. and a residence time of typically no less than 2 hours and no more than 4 hours. These operating conditions can cause corrosive damage to internals by release of residual HCl in the $TiO_2.H_2O$ particles that combines with evolving water to make a corrosive dilute acid material. This acid material can corrode the usual stainless-steel material used for such equipment. Constructing the dryer internals with corrosion resistant materials guards against such damage.

This dried solid fraction 80 can then pass to a calcining step 82. In some implementations, the dryer output is a free flowing solid with only minor moisture content of 1 to 3 wt %, and preferably about 2 wt % or less. Before entering the calcining step 82 the solid fraction may receive additives for purposes such as agglomeration control etc.

Calcination

The dried solid fraction 80 passes to a calcining step 82 to produce a $TiO_2$ hydrate. The calcination can use any suitable equipment and operating conditions. Preferably the calciner comprises a direct fired design and more preferably the calciner will use indirect fired gas circulation. Typically the calcination includes zone control to manage escalating temperature and will include multiple control points. BET surface area measurements can provide a control parameter indicating the desired reduction occurring during the calciner heat cycle of the calciner. $TiO_2$ hydrate has a typical surface area of 100 $m^2/g$ or higher and the calcination products surface area should ideally be less than 15 $m^2/g$ and preferably less than 10 $m^2/g$. The invention can gain particular advantage by using a calciner temperature in a range of 900 to 1050° C.

Calcined $TiO_2$ particles pass to the finishing step 84. The preferred direct fired units can create a color problem in the $TiO_2$ caused by incomplete combustion of the circulating gases that deposits carbon on the surface of the particles. Final temperature of the calciner governs surface area reduction of the particles to create a surface in the particles suitable for surface coating of chemicals added in the finishing process. In most cases the calcination operates at a pressure up to 5 bar-g, preferably from 0.15 to 4 bar-g more preferably 0.15 to 2 bar-g and most preferably at 0.15 to 0.25 bar-g.

Finishing and Packaging

The calcined material 83 can undergo further treatments, such as wet and/or dry grinding to remove agglomerates formed in the calciner and/or finishing by adding surface coatings which can include metal oxides to impart strength, weathering resistance, surface gloss and other coating properties. Equipment and methods for treatment include parallel stirred tanks that receive which inorganic salts of relevant metals (e.g., Zr, Al, Si, etc.) and/or resins with oxygen functionality such as methoxy hydrocarbons to cause precipitation of the of the finished material from the additive containing solution out of the solution. The precipitated material may undergo sizing and jet milling to remove residual materials and aggregates from the coating process. The final product can then be spray dried and packaged for shipment to commercial users.

The finishing treatments 84, schematically shown in FIGS. 1a and 2b, are usually selectively selected to suit recipes and specifications provided by the recipients of the finished materials or specifications dictated by customer requirements. Thus, the process produces ground calcined titanium dioxide that with or without optional coatings and additional components serves as a component of final or intermediate products. FIGS. 1b and 2b also show products from finishing 84 passing to packaging 86.

HCl Recovery and Recycle Arrangements

The process arrangement of FIGS. 1a,b differs from that of FIGS. 2a,b in their recovery of HCl and processing of raffinate 54. Both arrangements show recovery steps coupled to solvent extraction steps 34 and 50 followed by recycle of HCl to leaching step 16.

Both arrangements for the HCl recycle can use sulfuric acid to dehydrate the dilute HCl streams produced by this invention for re-use of a concentrated HCl solution. Thus, the chemistry of HCl recovery steps and flows can be adapted to suit different processing arrangements and product needs. Contacting dilute HCl streams, which may be recovered from any number of points of the process, with sulfuric acid dehydrates the HCl and creates sulfate salts of metals contained in the recycle acid. Subsequent water removal from the diluted acid (e.g., via evaporation) provides a concentrated HCl for recycle to leaching step 16. The HCl recovery system can also receive chloride sources from internal and/or external sources to balance the recycled HCl. The chloride balance in the process can be maintained to facilitate high process stability. Such balancing includes handling both chloride excesses and chloride deficiencies as they occur, to maintain the desired properties of the recycle acid and the overall stability of the continuous leaching step.

The different HCl recovery steps of FIG. 1 and FIG. 2 show how the process of this invention can advantageously control chloride usage based on the desired titanium dioxide production and its composition. The invention configurations shown and described reduce energy consumption in the recycle loop and can close the process loop for HCl total recycle from the process. Conventional methods tend to utilize roasting to produce by-products from a $TiO_2$ process (pyrometallurgical approach) such as $Fe_2O_3$ for iron removal or MgO for magnesium removal, but such conventional methods are capital and energy intensive and do not compensate economically for the chloride recycled to the $TiO_2$ process.

Many configurations of the HCl recovery system can recover an HCl stream with an HCl content above the HCl-water azeotrope of 20.24 wt % HCl. Various azeotrope-breaking techniques recover high concentration HCl from the dilute HCl streams produced by the process. The azeotrope-breaking techniques can include the addition of one or more breaker additives. The HCl content is preferably above the azeotrope concentration with water (i.e., above 20.24 wt % HCl), preferably at least 5 wt %, 10 wt % or 15 wt % above it. Accordingly, multiple arrangement of the invention including those of FIGS. 1 and 2 can readily overcome the presence of an azeotrope.

As outlined above this invention provides great flexibility in the multiple ways to recover and recycle HCl having the desired composition and concentrations as well by adjusting the chemistry of HCl recovery steps and flows associated therewith to suit different processing and product needs. FIGS. 1 and 2 illustrate some of the alternative process steps for doing so. FIGS. 1*a* and *b* detail a recovery and recycle arrangement that recovers iron liquor 42 as ferric chloride 43 without recovery of HCl from iron liquor 42. FIG. 2 shows an expanded variety of integrated HCl recycle and recovery with additional processing steps.

FIG. 1 shows two paths of HCl recovery. Both paths ultimately pass recovered HCl 22 from an evaporation step 90 to continuous leaching 16.

The simplest path passes raffinate 54 directly to evaporation step 90. All of the raffinate 54 can pass to evaporation 90 via this path. However, to gain more benefit from this invention only a portion of raffinate 54 goes to evaporation 90 and on to leaching 16 via this path.

FIG. 1*b* shows a more complex path of steps that treats at least a portion of raffinate 54 by adding $MgCl_2 \cdot 6H_2O$ crystals 87 and sulfuric acid 88 to all or a portion 55 of raffinate 54. The resulting mixture 91 enters an HCl recovery step 89 that produces a recovered magnesium sulfate 93 and a recovered HCl 95 that passes to evaporation step 90. Again, all, but preferably only a portion of raffinate 54 takes this more complex path.

FIGS. 2*a,b* shows three HCL recovery paths with different steps along with steps to supply an HCL burner 90 with supplemental liquid 61. Each of three of the independent paths may be used alone or in combination with one or more of the other independent paths. FIGS. 2*a,b* also shows the optional use a supplemental liquid 61 that can work in conjunction with at least one or more of these three recovery paths. All recovery paths and the supplemental liquid use feed the material recovered thereby to continuous leaching 16 via an HCl burner 90 that electrolyzes the solution to produce HCl.

FIG. 2*s* simplest path passes at least a portion of raffinate 54 directly to HCl burner 90. All of the raffinate 54 can pass to burner 90, However, one gains more benefit from this invention by passing only a portion of raffinate 54 directly to burner 90 and passing at least a portion of the raffinate through one or more optional series of treatment steps such as those shown in FIG. 2*a,b*.

A more complex path of steps shown in FIG. 2*a,b* (also substantially shown in FIG. 1) treats raffinate 54 by adding $MgCl_2$ crystals 87 and sulfuric acid (not shown) to at least a portion of raffinate 54. The resulting mixture 91 passes to a spray roaster 97 [[additional description of spray roaster could be helpful]] that produces magnesium sulfate 93 and recovered HCl 95 that passes to HCl burner 90.

As mentioned earlier, FIG. 2*a* shows an arrangement that crystallizes at least a portion of iron enriched liquor 42 in crystallizing step 44. This step produces ferric chloride solution 45 containing crystals to provide ferric chloride 43. The ferric chloride solution may have a composition suitable for commercial use and sale with characteristics as previously described in the context of FIG. 1*a*. Crystallizing step 44 also produces enriched HCl 46 that can pass alone or in admixture with raffinate 54 to HCL burner 90.

Supplemental liquid recovery collects one or both of liquid 63 and/or liquid 65 from solid-liquid separation steps 99 and 79, respectively via a liquid stream 61. Stream 61 passes one or a mixture of sole sourced liquids 63 and 65 to HCl burner 90 as a supplemental liquid. (Letter F connects stream 61 in FIG. 2*b* to FIG. 2*a*.)

Pressurized Operation

Conventional operations for Ti recovery typically employed employ atmospheric conditions that make it relatively difficult to operate a feasible commercial process. This invention can, with well known standard piping, valving and venting equipment, readily process the liquid and slurry streams under positive pressure, i.e., an operating pressure above atmospheric pressure, also defined as super-atmospheric conditions. Pressurized operation greatly improves the efficiency and effectiveness of the process over the standard systems of the prior art. Any and preferably all steps for leaching, solvent extraction, hydrolysis and related recovery steps can use pressurized conditions. Solvent extraction (Ti and Fe), and hydrolysis preferably use pressurized conditions. Leaching and solvent extraction stages preferably operate at pressure up to 0.25 bar-g and preferably in a range of from 0.15 to 0.2 bar-g. The hydrolysis stage usually operates at a pressure up to 3.5 bar-g and preferably in a range of from 0.15 to 0.25 bars-g. Appropriate equipment for pressurizing and depressurizing the streams can be used within appropriate piping, seals, inert gas systems, and the like.

Advantages of Titanium Processing Techniques

Thus, implementations of processes and systems described herein can facilitate the production of pigment grade titanium dioxide and/or the processing of various streams and materials in the context of extracting valuable materials from ore. Additional aspects of the process can be adapted to produce various other grades or titanium dioxide, if desired, although pigment grade titanium dioxide is preferably produced. Various processes and systems described herein can also produce other product streams, such as yellow pigment materials and magnesium sulfate. Additional processing can extract other compounds or materials from certain streams of the process, for example if the original ore or feed material contains certain valuable fractions.

The description of processes and systems in the context of FIGS. 1 and 2 does not limit the breadth of this invention to the specific arrangement of processing steps; input and output streams; and equipment shown therein. The process of this invention can use intermediate treatment units or operations not illustrated or described herein that subject certain streams to processing in between two units. For example, the pregnant liquor 30 produced by the separator 26 could be subjected to an additional treatment step prior to the chlorine addition 32. The solid residue stream 28 could undergo further processing prior to landfill disposal, and/or the titanium enriched stream 52 could receive processing prior to feeding into the hydrolysis reactor 58. Thus, a given output stream of one unit can feed directly into appropriate ancillary processing. Accordingly, other units and unit operations can complement the explicit description without departing from the invention as presented herein.

The invention claimed is:

1. A process for producing a titanium dioxide product using super-atmospheric pressure conditions, the process comprising:
   a. leaching a feed material in acidic leaching solution at high intensity and super atmospheric pressure to form a leaching slurry having a solids content of 20 wt % to 35 wt % on a total slurry basis, said titanium containing ore having a mean particle size below 100 microns and said an acidic leaching solution comprising water and HCl at an HCl concentration above 11N;
   b. separating the leaching slurry into a solid residue stream and a pregnant liquor comprising titanium and iron compounds and adding chlorine to the pregnant liquor to promote conversion of $FeCl_2$ into $FeCl_3$ to form a treated pregnant liquor;
   c. removing $FeCl_3$ by solvent extraction at super-atmospheric conditions to provide a $FeCl_3$ enriched stream and $FeCl_3$ depleted stream;
   d. recovering titanium compounds from the $FeCl_3$ depleted stream by solvent extraction at super-atmospheric conditions to produce a titanium enriched stream and a titanium depleted raffinate stream;
   e. recovering HCl from the $FeCl_3$ enriched stream and the titanium depleted raffinate stream for reuse in the leaching of step a.;
   f. hydrolyzing the titanium enriched stream under plug flow conditions, super-atmospheric pressure, and a temperature of 110° C. to 125° C. to produce a hydrolysate stream comprising $TiO_2.H_2O$ particles;
   g. drying the hydrolysate stream for 2 to 4 hours while maintaining the temperature in a range of 100° C. to 250° C. to remove interstitial water, to inhibit rupture of the $TiO_2.H_2O$ particles, and to produce a dried hydrolysate stream;
   h. calcining the dried hydrolysate stream to convert $TiO_2.H_2O$ to $TiO_2$ and produce a calcined $TiO_2$ material; and
   i. converting the calcined $TiO_2$ material into a pigment grade titanium oxide product.

2. The process of claim 1, wherein the titanium containing ore comprises ilmenite.

3. The process of claim 1, wherein the mean particle size of the feed material is from 50 microns to 100 microns.

4. The process of claim 1, wherein the HCl concentration of the acidic leaching solution is from 11N to 13N and the solids content of the leaching slurry is from 27 wt % to 33 wt %.

5. The process of claim 1, wherein pressure conditions for the leaching of step c. and the solvent extraction of step d. do not exceed about 0.2 bar-g.

6. The process of claim 1, wherein the recovering in step e. produces dilute HCl comprising an azeotrope that undergoes azeotrope breaking to recover an HCl stream that has an HCl concentration above its water-HCl azeotrope concentration.

7. The process of claim 1, wherein the hydrolyzing of step f. is performed in a hydrolysis reactor comprising a reaction conduit having at least one in-line mixer in its flow path providing mixing with substantially no back-mixing.

8. The process of claim 7, wherein the reaction conduit has a boustrophedonic configuration.

9. The process of claim 1, wherein the drying of step g. is conducted at a temperature of 120° C. to 230° C., and the dried hydrolysate stream is a free-flowing solid material with a moisture content of from 1 wt % to 3 wt %.

10. The process of claim 1, wherein the solvent extraction of step c. and/or step d. utilizes an organic composition comprising a modifier, a viscosity reducer, and an extractive solvent.

11. The process of claim 1, wherein the modifier comprises a distillation cut from propylene oxide production, the viscosity reducer comprises kerosene, and the extractive solvent comprises a ketone.

12. The process of claim 11, wherein the solvent extraction of step c. and step d. is performed at a temperature of about 35° C. to about 65° C.

13. The process of claim 1, wherein the hydrolyzing of step e. is performed at a pressure up to about 3.5 bar-g.

14. The process of claim 1, further comprising treating the $FeCl_3$ enriched stream of step c. to produce a commercially suitable ferric chloride solution.

15. The process of claim 1, further comprising adding sulfuric acid and $MgCl_2$ crystals to the titanium depleted raffinate stream of step d. and recovering magnesium sulfate from the resulting mixture.

16. The process of claim 1, wherein the leaching slurry of step a. receives anhydrous HCl to contact the titanium containing ore.

17. The process of claim 1 wherein the leaching step a. receives recycled HCl from at least one of the iron depleted stream, the HCl recovered from the drying of the hydrolysate and the HCl from the titanium depleted raffinate stream.

18. A process for producing a titanium oxide product using super-atmospheric pressure conditions, said process comprising:
   a. contacting a feed material comprising titanium containing ore having a mean particle size below 100 microns with an acidic leaching solution comprising water and HCl at an HCl concentration above 11 N and above the HCl azeotrope concentration in a high intensity leaching step at super-atmospheric pressure to form a leaching slurry having a solids content of 20 wt % to 35 wt % on a total slurry basis;

b. separating the leaching slurry into a solid residue stream and a pregnant liquor comprising titanium and iron compounds and adding chlorine to the pregnant liquor to promote conversion of $FeCl_3$ into $FeCl_3$ to form a treated pregnant liquor;

c. removing $FeCl_3$ by solvent extraction at super-atmospheric conditions to provide a $FeCl_3$ enriched stream and $FeCl_3$ depleted stream;

d. recovering titanium compounds from the $FeCl_3$ depleted stream by solvent extraction at super-atmospheric conditions using the same solvent as that used in step c. to produce a titanium enriched stream and a titanium depleted raffinate stream;

e. purifying the solvents in a single solvent purification zone to provide at least a portion of the solvent for steps c. and d.;

f. recovering HCl from the $FeCl_3$ enriched stream and the titanium depleted raffinate stream for reuse in the high intensity leaching;

g. hydrolyzing the titanium enriched stream under plug flow conditions, super-atmospheric pressure and at a temperature of 110° C. to 125° C. to produce a hydrolysate stream comprising $TiO_2.H_2O$ particles;

h. drying the hydrolysate stream for 2 to 4 hours while maintaining the temperature in a range of from 100° C. to 250° C. to remove interstitial water and inhibit rupture of the $TiO_2.H_2O$ particles, to produce a dried hydrolysate stream;

i. calcining the dried hydrolysate stream to convert $TiO_2.H_2O$ to $TiO_2$ and producing a calcined $TiO_2$ material; and j. converting the calcined $TiO_2$ material into a pigment grade titanium oxide product.

19. A hydrolysis method for hydrolyzing a titanium rich stream to produce a hydrolysate stream comprising $TiO_2.H_2O$ particles, the method comprising feeding the titanium rich stream into a plug flow reactor having a boustrophedonic reaction conduit operated under pressure conditions above atmospheric and at a temperature of from 110° C. to 125° C.

* * * * *